(12) United States Patent
Shirakawa et al.

(10) Patent No.: US 10,890,539 B1
(45) Date of Patent: Jan. 12, 2021

(54) SEMICONDUCTOR DEFECT INSPECTION APPARATUS

(71) Applicant: KIOXIA CORPORATION, Tokyo (JP)

(72) Inventors: Hiroaki Shirakawa, Yokkaichi Mie (JP); Kiminori Yoshino, Kuwana Mie (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 16/798,990

(22) Filed: Feb. 24, 2020

(30) Foreign Application Priority Data

Jun. 27, 2019 (JP) ................................. 2019-120124

(51) Int. Cl.
*G01N 21/95* (2006.01)
(52) U.S. Cl.
CPC ................................. *G01N 21/9505* (2013.01)
(58) Field of Classification Search
CPC ........................ G01N 21/9501; G01N 21/9505
See application file for complete search history.

(56) References Cited

U.S. PATENT DOCUMENTS

| | | | | |
|---|---|---|---|---|
| 6,191,849 B1* | 2/2001 | Maeshima | ......... | G01N 21/9501 356/237.1 |
| 2009/0262621 A1* | 10/2009 | Saito | ..................... | G11B 5/743 369/53.41 |
| 2015/0168311 A1* | 6/2015 | Seki | ................... | G01N 21/9501 356/51 |

FOREIGN PATENT DOCUMENTS

JP 5713419 B1 5/2015

* cited by examiner

*Primary Examiner* — Steven Whitesell Gordon
(74) *Attorney, Agent, or Firm* — Foley & Lardner LLP

(57) ABSTRACT

A semiconductor defect inspection apparatus for inspecting a specimen including a semiconductor substrate having a surface on which a predetermined pattern is formed, includes an excitation light irradiator, a polarization converter, a detector, and a defect analysis detector. The excitation light irradiator irradiates the specimen with excitation light along an optical path from the irradiator to the specimen and such that the excitation light is obliquely incident at a predetermined incident angle. The first polarization converter is disposed in the optical path, and converts the excitation light into s-polarized light. The detector detects photoluminescence light generated from the specimen when the excitation light is incident on the specimen. The defect analysis detector detects a dislocation defect by analyzing a photoluminescence image obtained by photoelectrically converting the photoluminescence light.

18 Claims, 7 Drawing Sheets

SEMICONDUCTOR DEFECT INSPECTION APPARATUS

CROSS-REFERENCE TO RELATED APPLICATION(S)

This application claims the benefit of and priority to Japanese Patent Application No. 2019-120124, filed Jun. 27, 2019, the entire contents of which are incorporated herein by reference.

FIELD

Embodiments described herein relate generally to a semiconductor defect inspection apparatus.

BACKGROUND

A defect inspection apparatus using a photoluminescence method is known as an apparatus for inspecting a defect present in a pattern formed on a semiconductor substrate.

DETAILED DESCRIPTION

Embodiments provide a semiconductor defect inspection apparatus capable of detecting a defect present on a patterned surface layer formed on a semiconductor substrate.

In general, according to one embodiment, a semiconductor defect inspection apparatus may include an excitation light irradiator, a first polarization converter, a detector and a defect analysis detector. The excitation light irradiator may be configured to irradiate a specimen formed of a semiconductor substrate with a surface on which a predetermined pattern is formed, with excitation light such that the excitation light is obliquely incident at a predetermined incident angle. The first polarization converter may be disposed in a middle of an optical path of the excitation light between the excitation light irradiator and the specimen, and configured to convert the excitation light into s-polarized light. The detector may be configured to detect photoluminescence light generated from the specimen when the excitation light is obliquely incident. The defect analysis detector may be configured to detect a dislocation defect by an analysis of a photoluminescence image obtained by photoelectrically converting the photoluminescence light.

Hereinafter, embodiments will be described with reference to the accompanying drawings.

Figure 1:
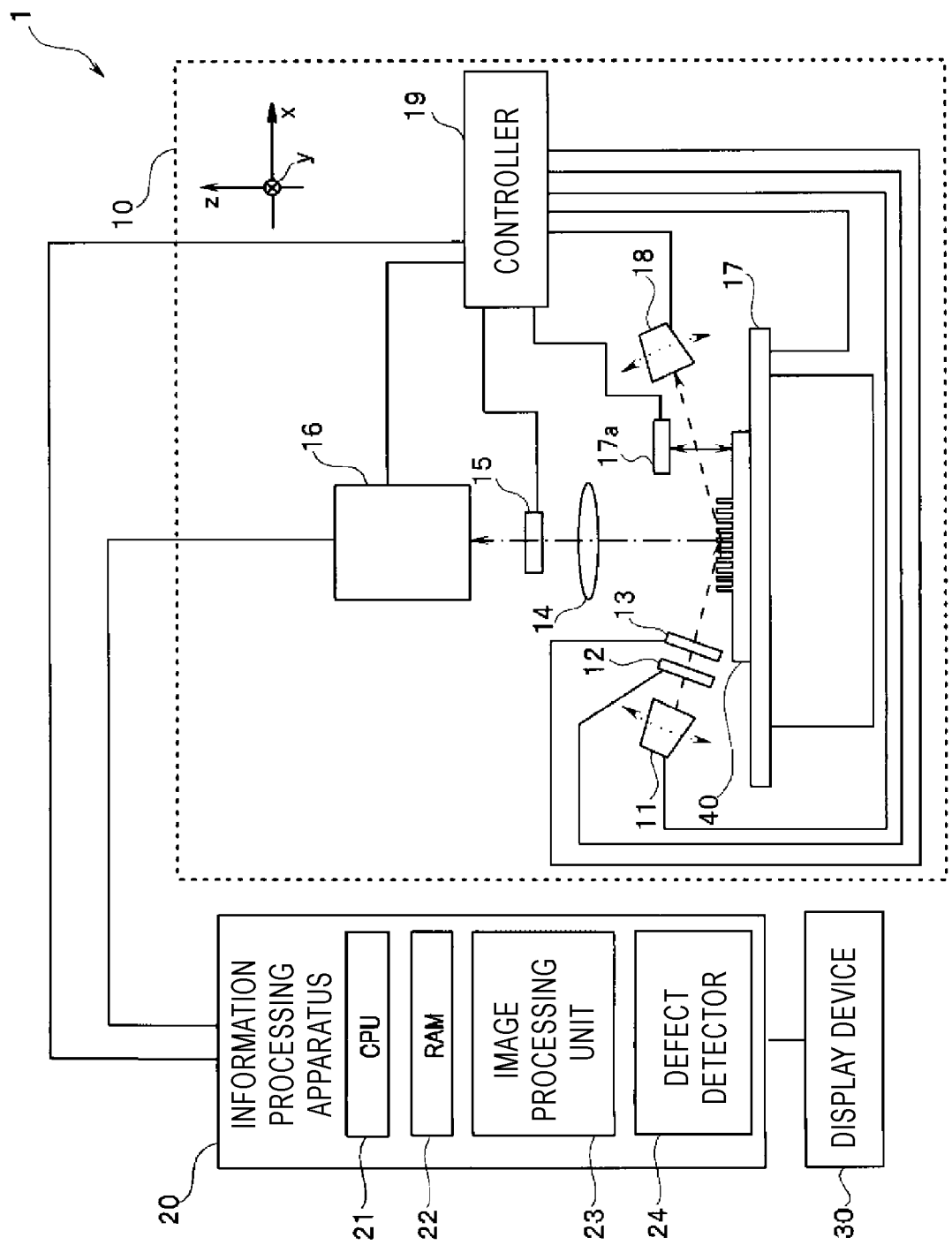
FIG. 1 is a block diagram illustrating an example of a configuration of a semiconductor defect inspection apparatus according to an embodiment.

FIG. 1 is a block diagram illustrating an example of a configuration of a semiconductor defect inspection apparatus according to an embodiment. A semiconductor defect inspection apparatus 1 of the present embodiment includes a photoluminescence measuring apparatus 10 and an information processing apparatus 20, and may be used for detecting a dislocation defect in a semiconductor device which is a specimen 40 (e.g., a silicon wafer on which a pattern such as an STI (shallow trench isolation) formation groove which is an element isolation region is formed). In addition, the semiconductor defect inspection apparatus 1 may include a display device 30 that displays information on a detected defect, data acquired during an inspection, or the like.

The photoluminescence measuring apparatus 10 may detect a defect present in the specimen, by irradiating the specimen with light and observing light generated when excited electrons return to a ground state (hereinafter, referred to as photoluminescence light). The photoluminescence measuring apparatus 10 includes an excitation light source 11, a polarizing plate 12, a light-source-side wavelength filter 13, a lens 14, a detection-side wavelength filter 15, and a generated light detector 16. Further, the photoluminescence measuring apparatus 10 includes a specimen stage 17, an autofocus mechanism 17a, a reflected light detector 18, and a controller 19.

The excitation light source 11 as an excitation light irradiator may be a light source that emits excitation light for generating photoluminescence light from the specimen 40. For example, a light source with energy larger than a forbidden bandwidth of a material constituting the specimen 40 may be used. For example, when the specimen 40 is a silicon wafer, a light source with energy larger than a forbidden bandwidth (1.2 eV) of silicon which is the material of the specimen 40 may be used. The excitation light irradiated from the excitation light source 11 may be visible light, or light in other wavelength bands such as UV light (ultraviolet light), DW light (far ultraviolet light), and IR light (infrared light) may be used. The excitation light emitted from the excitation light source 11 may be obliquely incident on the specimen 40 placed on the specimen stage 17 at a predetermined incident angle. In addition, the excitation light source 11 may have a structure in which the angle at which the emitted excitation light is incident on the specimen 40 may be changed.

The polarizing plate 12 as first and second polarization converters may be provided between the excitation light source 11 and the specimen stage 17. The polarizing plate 12 may convert the excitation light emitted from the excitation light source 11 into linearly polarized light having a single vibration plane. Specifically, the excitation light may be converted into s-polarized light of which electric field vibrates in a direction perpendicular to the incident surface when the excitation light is incident on the specimen 40, or p-polarized light of which electric field vibrates in the incident surface. In addition, the polarization direction may be determined by an instruction from the controller 19. Further, in the geometric optics, the incident surface refers to a surface which is perpendicular to a reflection surface when a light beam is incident on another material, and includes the incident light beam and a reflected light beam. The surface of the specimen 40 on which the excitation light is incident will be referred to as the specimen surface.

The light-source-side wavelength filter 13 may be provided between the polarizing plate 12 and the specimen stage 17. The light-source-side wavelength filter 13 may transmit only a specific wavelength in the excitation light converted by the polarizing plate 12 into predetermined linearly polarized light, and cut other wavelengths (e.g., noise or the like). For example, when a visible light source is used as the excitation light source 11, light having a wavelength band of 380 nm to 780 nm which is a wavelength band of visible light may be transmitted. Further, for example, when illumination light with a single wavelength such as an Ar UV laser (360 nm) is used, light with the corresponding wavelength (360 nm) may be transmitted. The excitation light emitted from the light-source-side wavelength filter 13 may be incident on the specimen 40.

The lens 14 may be provided between the specimen stage 17 and the generated light detector 16. When a dislocation defect is present in the specimen 40, when the excitation light is incident, electrons present in the dislocation defect may absorb the energy of the light and may be excited. When the excited electrons return to the ground state, the absorbed energy may be released as photoluminescence light. The photoluminescence light emitted from the specimen 40 may be collected by the lens 14.

The detection-side wavelength filter 15 may be provided between the lens 14 and the generated light detector 16. The detection-side wavelength filter 15 may transmit light having a desired wavelength band, in the light collected by the lens 14 and incident on the detection-side wavelength filter 15. In general, the wavelength of the photoluminescence light may be longer than the wavelength of the excitation light. Thus, by cutting the wavelength band of the excitation light, it is possible to remove light which causes disturbance at the time of the measurement of, for example, reflected light of the excitation light, while transmitting the photoluminescence light. In addition, when the excitation light is incident on the specimen 40, photoluminescence light with various wavelengths is generated according to, for example, types of defects. For example, by transmitting light having the wavelength band of the photoluminescence light caused by a dislocation defect and cutting other wavelengths, it is possible to extract only the dislocation defect.

The generated light detector 16 as a detector may detect and photoelectrically convert the photoluminescence light having the specific wavelength band that has passed through the detection-side wavelength filter 15. For the photoelectric conversion, for example, a CCD (charge coupled device) or a CMOS image sensor may be used. An electrical signal generated by the photoelectric conversion and having a magnitude corresponding to the detected intensity of the photoluminescence light may be A/D converted and digitized, and then, output to the information processing apparatus 20. The generated light detector 16 may be disposed vertically above the surface of the specimen stage 17.

The specimen stage 17 may be movable in two orthogonal directions (x direction and y direction) which are parallel to the surface of the specimen stage 17, by a driving means such as a motor (not illustrated). By moving the specimen stage 17 in the x direction and/or the y direction, the excitation light may be relatively two-dimensionally scanned onto the specimen 40. In addition, the specimen stage 17 may be moved in a direction orthogonal to the surface of the specimen stage 17 (z direction) by the autofocus mechanism 17a.

The reflected light detector 18 may detect the intensity of the reflected light from the specimen 40 by the excitation light incident on the specimen 40 from the excitation light source 11 via the polarizing plate 12 and the light-source-side wavelength filter 13. The reflected light detector 18 may be movable. That is, the location of the reflected light detector 18 may be controlled such that the reflected light which is reflected from the specimen 40 at the same angle as the incident angle of the excitation light is perpendicularly incident on a sensor (not illustrated) provided in the reflected light detector 18.

The controller 19 may control the overall operation of the photoluminescence measuring apparatus 10. Specifically, for example, the controller 19 may control the excitation light source 11 such that the excitation light is incident on the specimen 40 at a predetermined incident angle, or control the reflected light detector 18 such that the reflected light from the specimen 40 is perpendicularly incident on the sensor of the reflected light detector 18. Further, the controller 19 may instruct the polarization direction of the excitation light to the polarizing plate 12 or designate the wavelength band of the excitation light to be transmitted through the light-source-side wavelength filter 13. Further, in order to adjust the location where the excitation light is incident on the specimen 40, the controller 19 may instruct the movement of the location of the stage to the autofocus mechanism 17a. Further, the controller 19 may designate the wavelength band of light to be transmitted through the detection-side wavelength filter 15. Further, the controller 19 may control various settings of the generated light detector 16.

The controller 19 may transmit information on the location of the specimen stage 17, that is, the incidence location (coordinates) of the excitation light on the specimen 40, to the information processing apparatus 20. Further, the controller 19 may receive initial setting information for the defect inspection or information of change in setting contents at each step, from the information processing apparatus 20.

The information processing apparatus 20 as a defect analysis detector is, for example, a computer, and includes a central processing unit (CPU) 21, a RAM 22, an image processing unit 23, and a defect detector 24. The information processing apparatus 20 may analyze (1) data input from the photoluminescence measuring apparatus 10 (the electrical signal having a magnitude corresponding to the detected intensity of the photoluminescence light output from the generated light detector 16, and (2) the incidence location (coordinates) of the excitation light on the specimen 40 which is output from the controller 19), so as to detect a dislocation defect. In addition, the information processing apparatus 20 may output an instruction for detecting a defect, to the photoluminescence measuring apparatus 10.

The CPU 21 may operate according to a program stored in a memory (not illustrated), and control each unit of the information processing apparatus 20. The RAM 22 may store data input from the photoluminescence measuring apparatus 10 or store a detection result from the defect detector 24.

The image processing unit 23 may generate a photoluminescence image, based on the electrical signal input from the generated light detector 16. The photoluminescence image may be an image obtained by mapping the detected intensity of the photoluminescence light to the incidence location (coordinates) of the light irradiated to the specimen 40.

The defect detector 24 may detect a dislocation defect present in the specimen 40, based on the photoluminescence image generated by the image processing unit 23. More specifically, the defect detector 24 may compare a photoluminescence image based on the photoluminescence light emitted from the specimen 40 by the excitation light converted into the s-polarized light, with a photoluminescence image based on the photoluminescence light emitted from the specimen 40 by the excitation light converted into the p-polarized light, so as to detect a dislocation defect present on the surface layer of the specimen 40. In addition, the above-described operation of the defect detector 24 may be stored as a program in advance in a memory (not illustrated), and the CPU 21 may execute the program such that the defect detection may be performed in the software manner.

Figure 2:
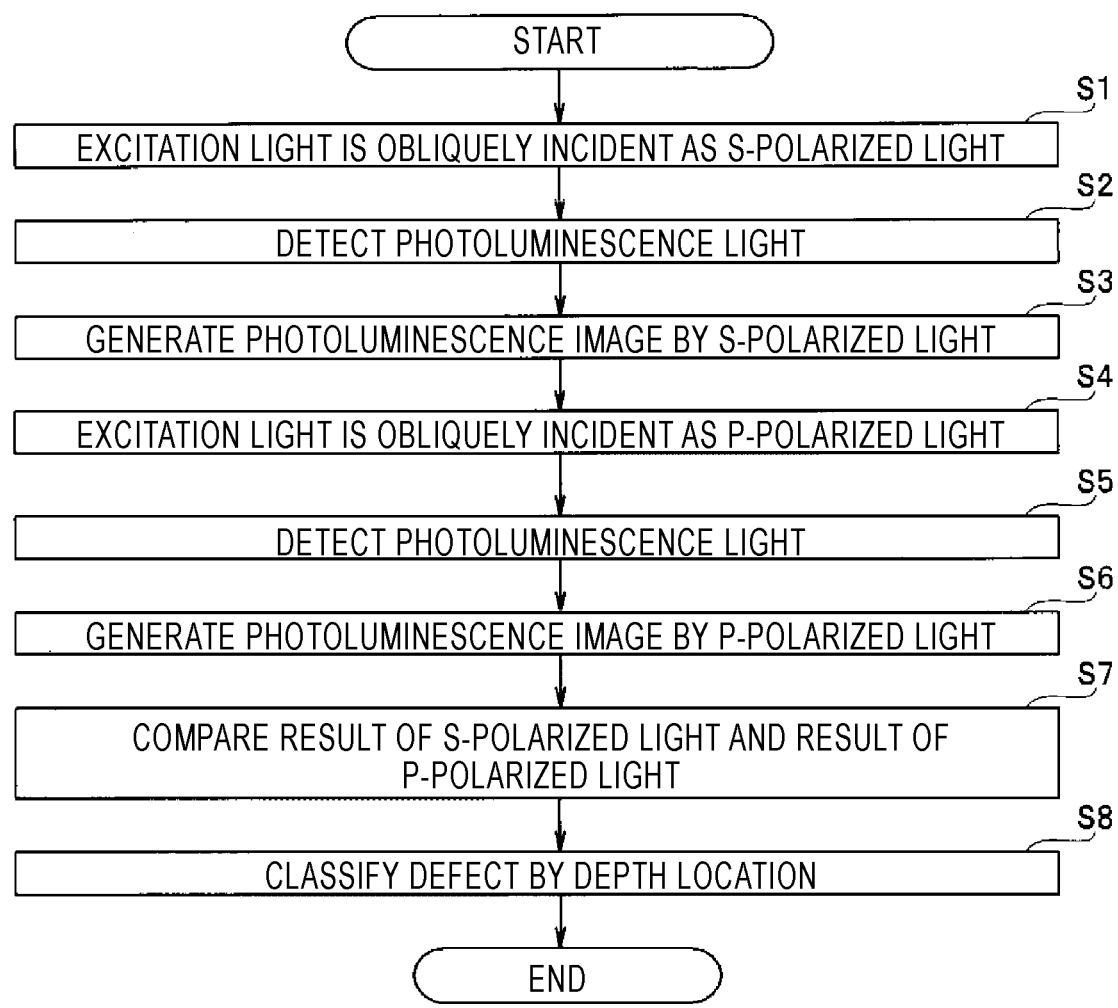
FIG. 2 is a flowchart illustrating an example of a procedure of a semiconductor defect inspection method according to an embodiment.

Next, a procedure of a semiconductor defect inspection method in an embodiment will be described with reference to FIG. 2. FIG. 2 is a flowchart illustrating an example of the procedure of the semiconductor defect inspection method according to the present embodiment. By executing the procedure illustrated in FIG. 2, it is possible to detect a dislocation defect present in the specimen 40, and to extract that the dislocation defect is present on the surface layer, from the detected dislocation defect. In addition, it is assumed that the incident angle of the excitation light on the specimen 40 is determined prior to the execution of the procedure of FIG. 2.

In addition, the incident angle of the excitation light on the specimen 40 may be determined as follows. First, a specimen which has the same substrate structure as the specimen 40 and has no pattern on the surface thereof (hereinafter, referred to as a bare reference specimen) may be prepared. Excitation light may be incident on the bare reference specimen as s-polarized light while changing the incident angle θ in a range of 0° to 90°, to measure the penetration depth PDs of the excitation light. Subsequently, the same excitation light as described above may be incident on the same bare reference specimen as p-polarized light while changing the incident angle θ in a range of 0° to 90°, to measure the penetration depth PDp of the excitation light. In the specimen 40, a depth TD of the surface layer desired to be subjected to the detection of a dislocation defect (hereinafter, referred to as an inspection target depth) may be set, and an incident angle range in which the penetration depth PDp is deeper (greater) than the inspection target depth TD and the penetration depth PDs is shallower than the inspection target depth TD may be detected. Then, an incident angle θ used for the inspection may be set from the detected incident angle range.

Figure 3A:
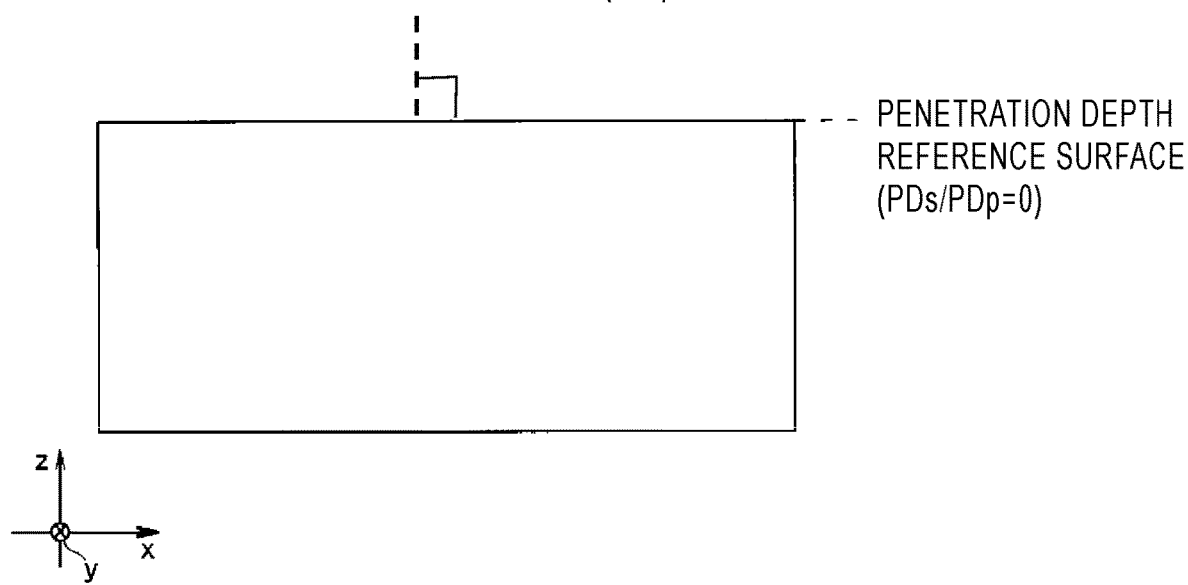
FIG. 3A is an example of a reference specimen with a flat surface.
Figure 3B:
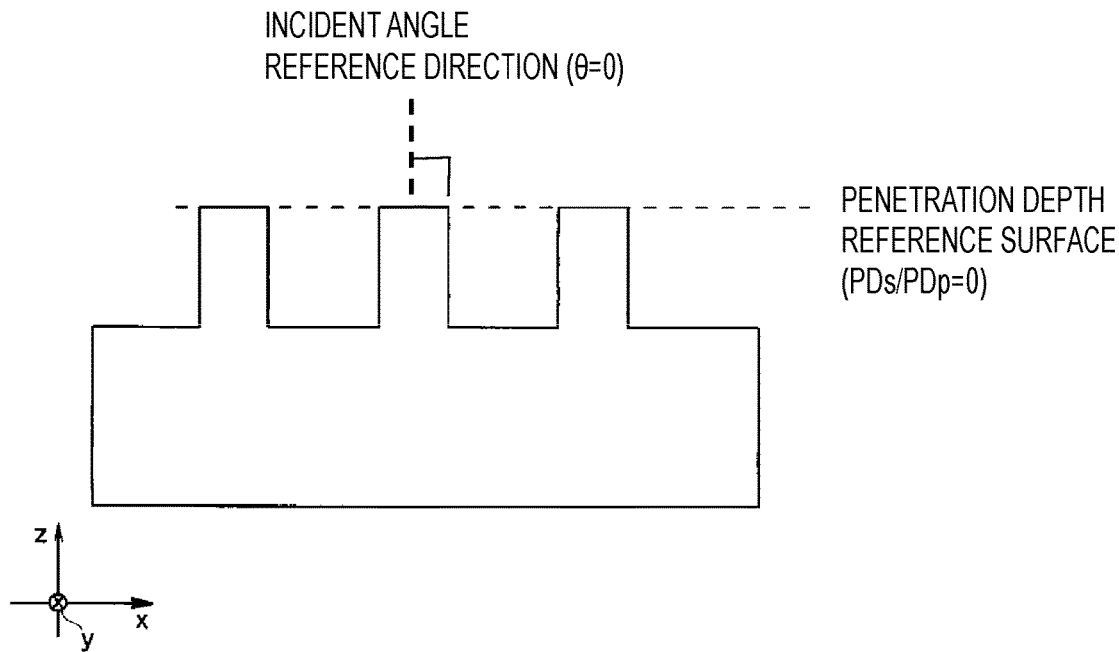
FIG. 3B is an example of a reference specimen with a surface on which a pattern is formed.
Figure 3C:
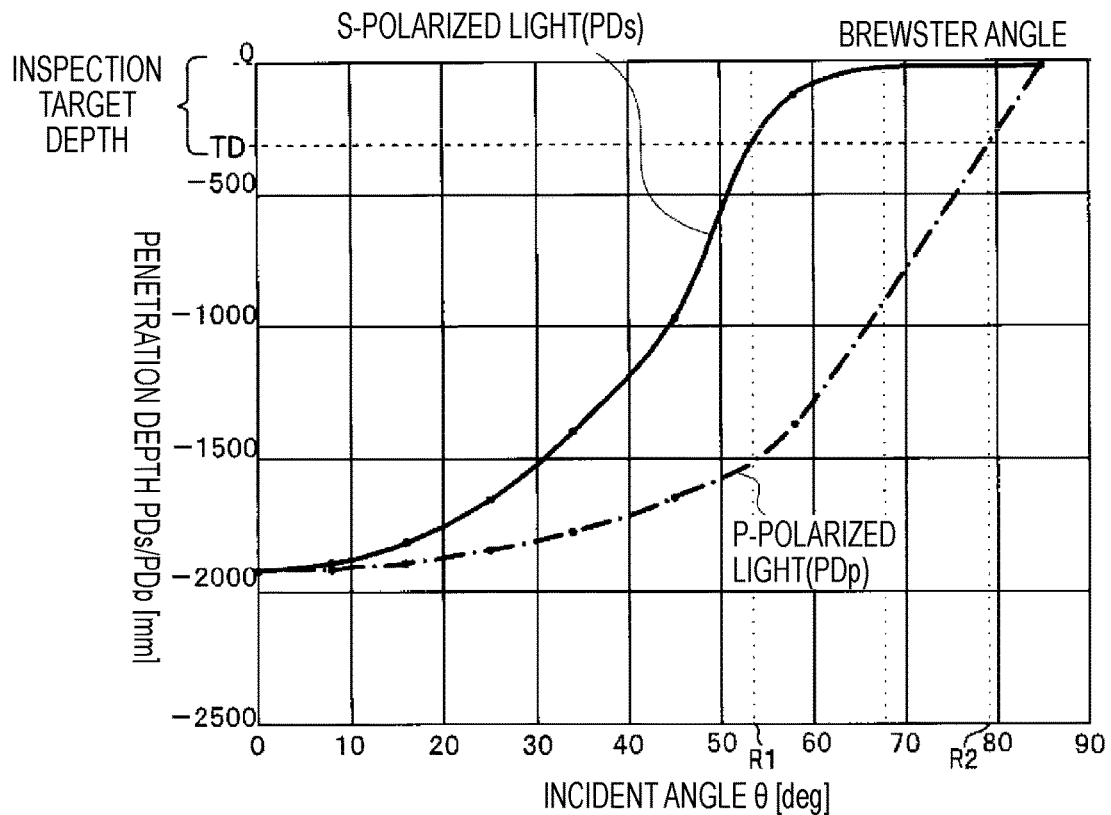
FIG. 3C is an example of a relationship between an incident angle and a penetration depth of excitation light in the reference specimen illustrated in FIG. 3A.
Figure 3D:
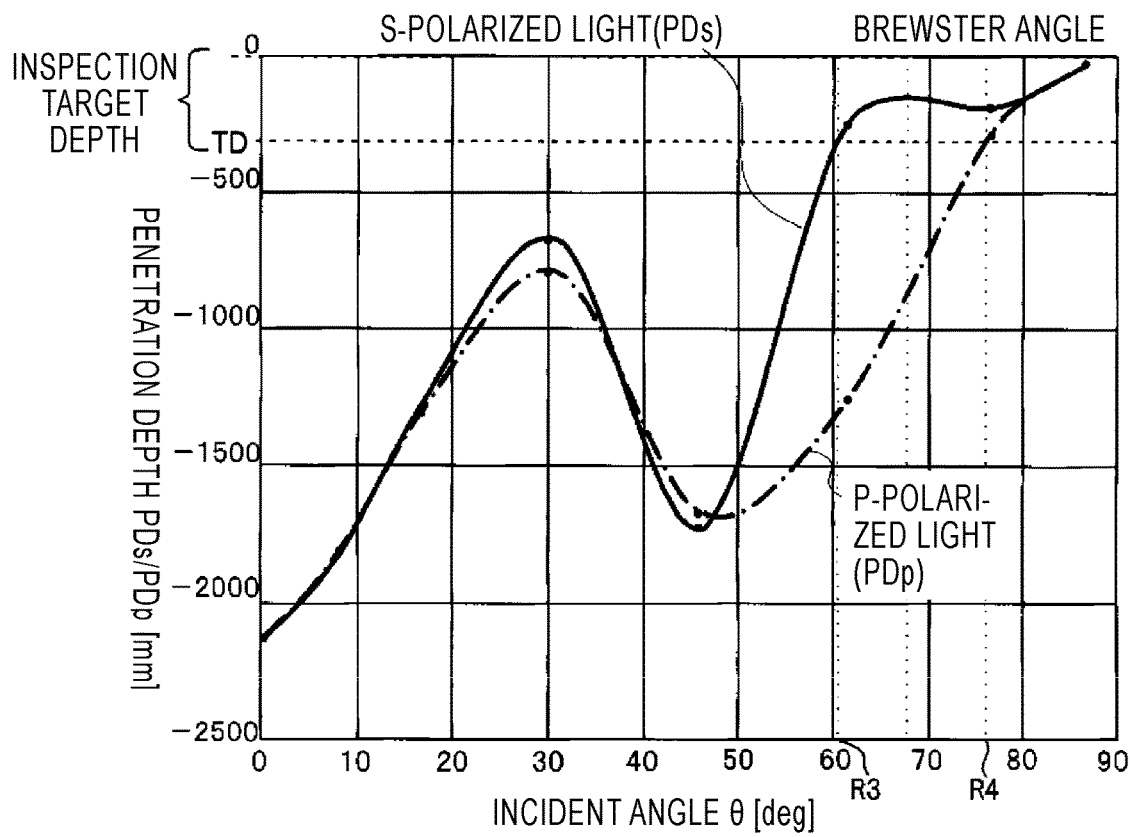
FIG. 3D is an example of a relationship between an incident angle and a penetration depth of excitation light in the reference specimen illustrated in FIG. 3B.

FIGS. 3A and 3B are examples of a reference specimen used for acquiring the relationship between the incident angle θ and the penetration depth PDs/PDp of the excitation light. Further, FIGS. 3C and 3D are views illustrating an example of the relationship between the incident angle θ and the penetration depth PDs/PDp of the excitation light. FIG. 3C represents characteristics when the excitation light is incident on the reference specimen illustrated in FIG. 3A. Further, FIG. 3D represents characteristics when the excitation light is incident on the reference specimen illustrated in FIG. 3B. In addition, in the descriptions herein below, a reference specimen that has no unevenness and is in the flat state as illustrated in FIG. 3A will be referred to as a bare reference specimen. In addition, a reference specimen with the surface on which an uneven pattern is formed as illustrated in FIG. 3B will be referred to as a patterned reference specimen.

In FIGS. 3C and 3D, the relationship between the penetration depth PDs and the incident angle θ when s-polarized light is incident is indicated by a solid line, and the relationship between the penetration depth PDp and the incident angle θ when p-polarized light is incident is indicated by an alternate long and short dash line. Further, in FIGS. 3C and 3D, the penetration depth PDs/PDp which is the vertical axis is set such that the reference specimen surface is the origin (=0 nm) and the upper vertical direction is the positive direction. That is, the direction in which an element is formed on the surface of the reference specimen is defined as the positive direction, and the direction of the rear surface of the substrate is defined as the negative direction. Still Further, in FIGS. 3C and 3D, the incident angle θ which is the horizontal axis is set such that a right angle with respect to the reference specimen surface is the origin (=0 deg).

In addition, the s-polarized light is polarized light of which electric field vibrates in a direction perpendicular to the incident surface when the excitation light is incident on the specimen 40, that is, in the horizontal direction with respect to the specimen surface. Meanwhile, the p-polarized light is polarized light of which electric field vibrates in the horizontal direction with respect to the incident surface when the excitation light is incident on the specimen 40, that is, in the vertical direction with respect to the specimen surface. Due to the difference in vibration direction, the p-polarized light is more likely to penetrate the specimen 40 in the depth direction of the specimen 40 than the s-polarized light. That is, when the s-polarized light and the p-polarized light of the same excitation light are incident on the specimen 40 at the same incident angle θ, the penetration depth PDp of the p-polarized light is deeper (greater) than the penetration depth PDs of the s-polarized light. With these characteristics, by using an angle region in which the penetration depth PDs is shallower than the inspection target depth TD for the s-polarized light and the penetration depth PDp is deeper (greater) than the inspection target depth TD for the p-polarized light, it is possible to detect a dislocation defect present in the specimen 40, and selectively extract a dislocation defect on the surface layer.

For example, in detecting a dislocation defect present in the STI formation groove, the inspection target depth TD may be set to a depth from the surface of the specimen to the bottom of the STI formation groove. For example, in a semiconductor manufacturing process in which the depth of STI is about 300 nm to 400 nm, the inspection target depth TD may be set to 0 nm to −400 nm. Here, descriptions will be made on a case where the inspection target depth TD is set to 0 nm to −400 nm. As illustrated in FIG. 3C, the penetration depth PDs of the s-polarized light is in the range of 0 nm to −400 nm in the angle region of an incident angle R1 or more. Meanwhile, the penetration depth PDp of the p-polarized light is in the range of 0 nm to −400 nm in the angle region of an incident angle R2 or more (where R1<R2). Accordingly, the range from the incident angle R1 to the incident angle R2 is the incident angle range. An incident angle θ used for the inspection may be set from the incident angle range specified as described above.

In addition, the incident angle characteristic of the penetration depth PDs/PDp of polarized light when the excitation light is irradiated to the patterned reference specimen may be different from the characteristic of the bare reference specimen described above, due to the scattering, etc., of the excitation light in the patterned portion. When the inspection target depth is set to 0 nm to −400 nm, in the patterned reference specimen, the penetration depth PDs of the s-polarized light is in the range of 0 nm to −400 nm in the angle region of an incident angle R3 (>R1) or more as illustrated in FIG. 3D. Meanwhile, the penetration depth PDp of the p-polarized light is in the range of 0 nm to −400 nm in the angle region of an incident angle R4 or more (<R2) (where R3<R4). Accordingly, the range from the incident angle R3 to the incident angle R4 is the incident angle range, and thus, may be narrower than the incident angle range determined using the bare reference specimen (the range from the incident angle R1 to the incident angle R2). Thus, it is preferable to measure the incident angle characteristic of the penetration depth PDs/PDp of the polarized light using the patterned reference specimen having the same pattern structure as the specimen 40, and to determine an incident angle θ of the excitation light for the actual inspection.

In addition, there is known a technique in which excitation light is incident at an angle at which the reflectivity of p-polarized light becomes zero (0) (Brewster angle) so that the intensity of photoluminescence light obtained by the p-polarized light is increased, and the detection accuracy of a dislocation defect is improved. In the semiconductor defect detection apparatus of the present embodiment, a dislocation defect present on the surface layer portion may be detected by the comparison between a photoluminescence image obtained by s-polarized light and a photoluminescence image obtained by p-polarized light, and the incident angle θ of the excitation light may only have to be in the incident angle range described above without being limited to the Brewster angle.

The procedure for detecting a dislocation defect present on the surface layer of the specimen 40 will be described returning to FIG. 2. First, the specimen 40 may be set on the specimen stage 17, and the specimen stage 17 may be adjusted such that the region to be inspected is placed at the irradiation location of the excitation light. Then, the specimen 40 may be irradiated with the excitation light from the excitation light source 11 (S1). At this time, the polarizing plate 12 is adjusted according to an instruction from the controller 19, such that the excitation light is changed into s-polarized light. Further, as for the angle at which the excitation light is obliquely incident on the specimen 40, the incident angle θ set in the stage previous to the inspection as described above may be used.

Next, the generated light detector 16 may detect photoluminescence light generated from the specimen 40 by the s-polarized light of the excitation light (S2).

Figure 4A:
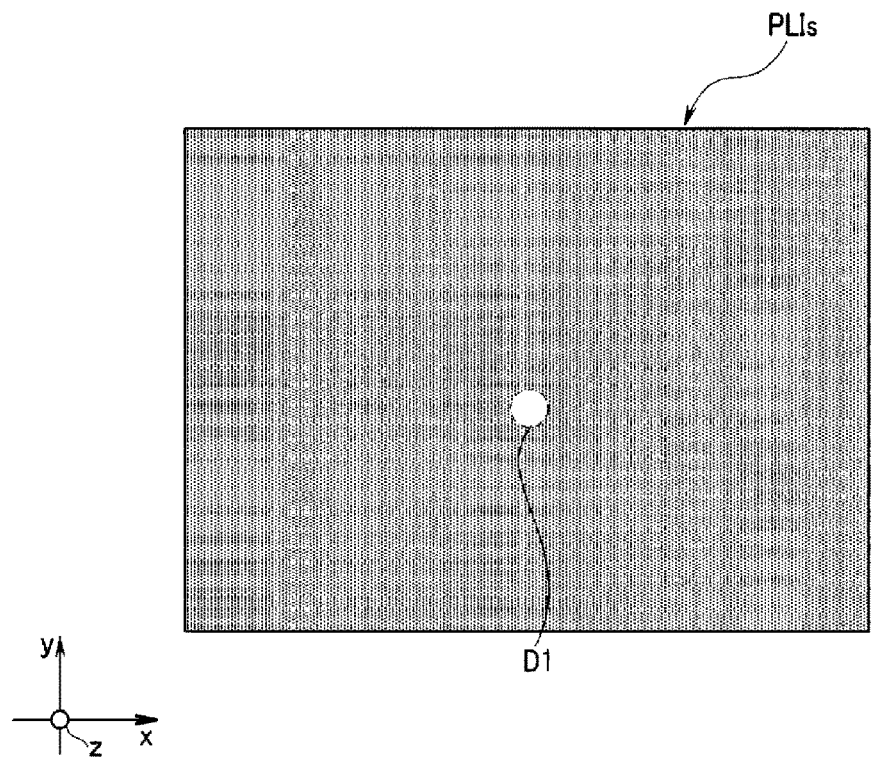
FIG. 4A is an example of a photoluminescence image when excitation light is obliquely incident on a specimen as s-polarized light.

Subsequently, an electrical signal having a magnitude corresponding to the detected intensity of the photoluminescence light detected by the generated light detector 16 may be input to the information processing apparatus 20. The image processing unit 23 of the information processing apparatus 20 may generate a photoluminescence image based on the input electrical signal (S3). FIG. 4A is an example of the photoluminescence image when the excitation light is obliquely incident on the specimen as s-polarized light. That is, the region where the photoluminescence light may be detected (the region where the detected intensity exceeds a set threshold; a region D1 inside the white circle in FIG. 4A) may be displayed bright, and the other regions may be displayed dark. In this case, the region D1 may be classified into a region where a dislocation defect occurs, and the other regions may be classified into a region where no dislocation defect occurs. Hereinafter, the photoluminescence image when the excitation light is obliquely incident as s-polarized light will be referred to as a photoluminescence image PLIs. The generated photoluminescence image PLIs is stored in the RAM 22.

Subsequently, according to an instruction from the controller 19, the polarizing plate 12 may be adjusted such that the excitation light is changed into p-polarized light (S4). At this time, the excitation light emitted from the excitation light source 11 or the incident angle θ on the specimen 40 may maintain in the state of S1.

Subsequently, the generated light detector 16 may detect the photoluminescence light generated from the specimen 40 by the p-polarized light of the excitation light (S5).

Figure 4B:
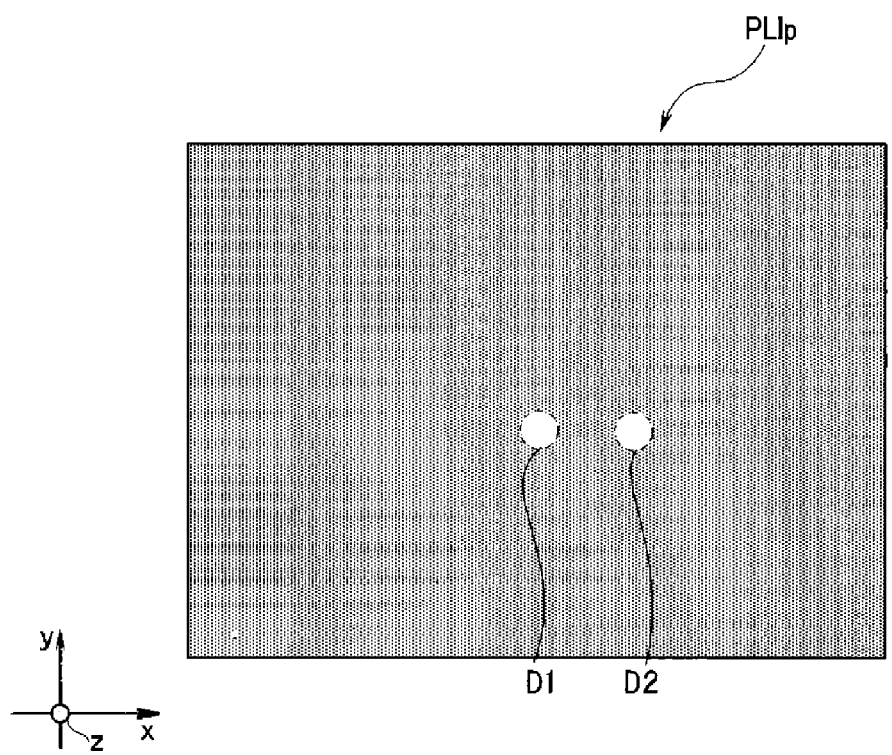
FIG. 4B is an example of a photoluminescence image when excitation light is obliquely incident on a specimen as p-polarized light.

Subsequently, an electrical signal having a magnitude corresponding to the detected intensity of the photoluminescence light detected by the generated light detector 16 may be input to the information processing apparatus 20. The image processing unit 23 of the information processing apparatus 20 may generate a photoluminescence image based on the input electrical signal (S6). FIG. 4B is an example of the photoluminescence image when the excitation light is obliquely incident on the specimen as p-polarized light. That is, the region where the photoluminescence light is detected (the region where the detected intensity exceeds the set threshold; regions D1 and D2 inside the white circles in FIG. 4B) may be displayed bright, and the other regions may be displayed dark. In this case, the regions D1 and D2 may be classified into a region where a dislocation defect occurs, and the other regions may be classified as a region where no dislocation defect occurs. Hereinafter, the photoluminescence image when the excitation light is obliquely incident as p-polarized light will be referred to as a photoluminescence image PLIp. The generated photoluminescence image PLIp may be stored in the RAM 22.

Subsequently, the defect detector 24 may compare the photoluminescence image PLIs generated in S3 and the photoluminescence image PLIp generated in S6 with each other (S7). Specifically, a difference in pixel value between the photoluminescence image PLIs and the photoluminescence image PLIp at the same pixel location may be acquired, and a region where the difference value exceeds a predetermined threshold may be extracted. For example, when the photoluminescence image PLIs illustrated in FIG. 4A and the photoluminescence image PLIp illustrated in FIG. 4B are compared with each other, the region D2 may be extracted as the region where the difference in pixel value exceeds a predetermined threshold.

Figure 5A:
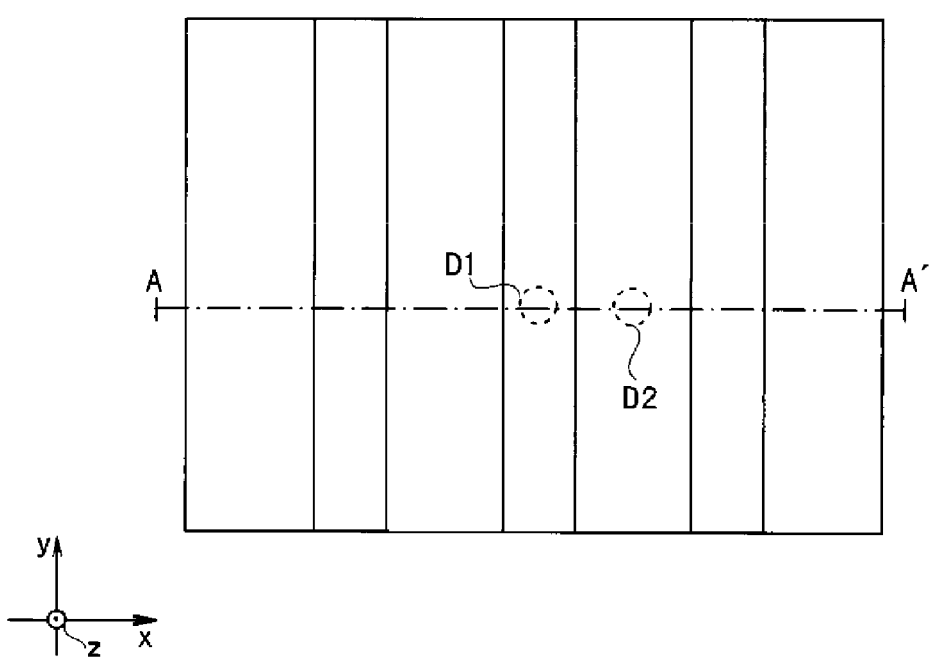
FIG. 5A is a plan view for illustrating a location of a defect in a specimen.
Figure 5B:
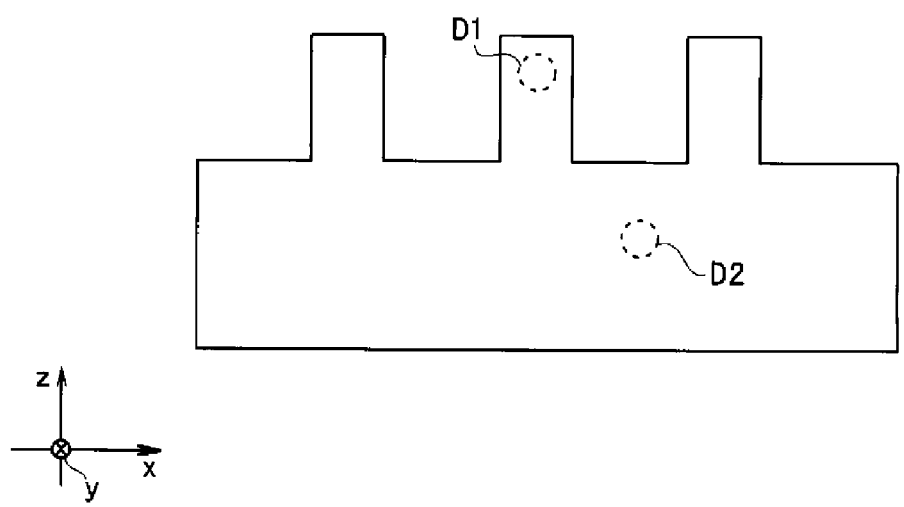
FIG. 5B is a cross-sectional view for illustrating a location of a defect in a specimen.

Finally, based on the comparison result of S7, the dislocation defect present in the specimen 40 may be classified by the presence location in the depth direction from the surface of the specimen 40 (S8). The classification of the dislocation defect in S8 will be described with reference to FIGS. 5A and 5B. FIG. 5A is a plan view for illustrating the location of the defect in the specimen. Further, FIG. 5B is a cross-sectional view for illustrating the location of the defect in the specimen.

The dislocation defect detected by the s-polarized light of the excitation light, that is, the defect detected in the photoluminescence image PLIs may be present at a location from the surface of the specimen 40 to the penetration depth PDs of the s-polarized light in a predetermined incident angle range. Further, the dislocation defect detected by the p-polarized light of the excitation light, that is, the defect detected in the photoluminescence image PLIp may be present at the location from the surface of the specimen 40 to the penetration depth PDp of the p-polarized light. Thus, the defect extracted in S6 may be present at a location deeper than the penetration depth PDs of the s-polarized light in a predetermined incident angle range. Accordingly, the defect detected in the photoluminescence image PLIp may be a dislocation defect present on the surface layer and inside of the specimen 40 when the defect is classified in the depth direction, and the defect detected in the photoluminescence image PLIs may be a dislocation defect present on the surface layer of the specimen 40.

Descriptions will be made on, for example, a case where the inspection of the specimen 40 with the surface on which the STI formation groove that extends in the y direction is formed is performed. FIG. 5A is a view in which the regions D1 and D2 detected by the photoluminescence image PLIp as illustrated in FIG. 4B are mapped to the plan view of the specimen 40. For example, the view illustrated in FIG. 5B is a cross-sectional view of the specimen 40 taken along a line passing through the regions D1 and D2 and parallel to the x direction (AA'line in FIG. 5A). That is, the defect detected in the photoluminescence image PLIs (the defect present in the region D1) may be located in a channel region which is the surface layer of the specimen 40. Meanwhile, the defect detected only in the photoluminescence image PLIp (the defect present in the region D2) may be present at the bottom of the STI formation groove and may be located inside the specimen 40.

With the classification of the defect in the depth direction in S8, the series of processes for the semiconductor defect inspection of the present embodiment may be completed.

As described above, according to the present embodiment, the s-polarized light of the excitation light may be obliquely incident on the specimen 40 at a predetermined incident angle θ, to generate photoluminescence light. By using the relationship between the incident angle θ and the penetration depth PDs of the s-polarized light, the s-polarized light may be irradiated at an incident angle θ at which the penetration depth PDp of the s-polarized light in the specimen 40 becomes the detection target depth, so that only a dislocation defect present on the surface layer of the specimen 40 may be detected. Accordingly, when a pattern is formed on a semiconductor substrate, a dislocation defect present on the patterned surface layer may be selectively detected. Further, by using both the p-polarized light and the s-polarized light, a dislocation defect present in the specimen 40 may be classified in the depth direction.

In addition, the semiconductor defect inspection apparatus of the present embodiment may be used for a line inspection in a manufacturing process of a semiconductor memory device (inspection performed during the manufacturing process). For example, the semiconductor defect inspection apparatus of the present embodiment may be used for a defect screening inspection which is performed subsequent to a step of forming the STI formation groove in a semiconductor substrate. In a semiconductor memory device, generally, while a dislocation defect present on the patterned surface layer affects the electrical characteristic, a dislocation defect present inside a semiconductor substrate does not affect the electrical characteristic. That is, by selectively detecting a dislocation defect present on the patterned surface layer, only a dislocation defect that causes a problem in the electrical characteristic may be detected, so that the inspection may be performed efficiently, and the yield of products or the throughput of production may be improved.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A semiconductor defect inspection apparatus for inspecting a specimen including a semiconductor substrate having a surface on which a predetermined pattern is formed, comprising:
   an excitation light irradiator configured to irradiate the specimen with excitation light along an optical path from the irradiator to the specimen and such that the excitation light is obliquely incident at a predetermined incident angle;
   a first polarization converter, disposed in the optical path, configured to convert the excitation light into s-polarized light;
   a detector configured to detect photoluminescence light generated from the specimen when the excitation light is incident on the specimen; and
   a defect analysis detector configured to detect a dislocation defect by analyzing a photoluminescence image obtained by photoelectrically converting the photoluminescence light.

2. The semiconductor defect inspection apparatus according to claim 1, further comprising:
   a second polarization converter configured to convert the excitation light into p-polarized light; and
   a controller configured to determine a polarization direction of the excitation light, and control the first polarization converter and the second polarization converter such that the excitation light is converted into linearly polarized light in the determined polarization direction,
   wherein the defect analysis detector is configured to compare the photoluminescence light generated from the specimen when the s-polarized light is obliquely incident, with the photoluminescence light generated from the specimen when the p-polarized light is obliquely incident at the location where the s-polarized light is obliquely incident, to classify the dislocation defect in a depth direction of the specimen.

3. The semiconductor defect inspection apparatus according to claim 2, wherein the excitation light irradiator is configured to irradiate with the excitation light at the incident angle at which a penetration depth of the s-polarized light in the specimen is equal to or less than a predetermined depth, and a penetration depth of the p-polarized light in the specimen is greater than the predetermined depth.

4. The semiconductor defect inspection apparatus according to claim 3, wherein the incident angle is equal to or more than an angle at which a reflectivity becomes zero when the p-polarized light is obliquely incident on the specimen.

5. The semiconductor defect inspection apparatus according to claim 2, wherein
   the semiconductor substrate includes a groove which recedes from the surface, and
   the excitation light irradiator irradiates the semiconductor substrate from a side of the surface with the excitation light at the incident angle at which a penetration depth of the s-polarized light is less than a height of a bottom of the groove, and at which a penetration depth of the p-polarized light is more than the height of the bottom of the groove.

6. The semiconductor defect inspection apparatus according to claim 5, wherein the groove is a shallow trench isolation formation groove formed in the semiconductor substrate.

7. The semiconductor defect inspection apparatus according to claim 2, wherein the defect analysis detector is configured to compare a pixel value of the photoluminescence light generated from the specimen when the s-polarized light is obliquely incident, with a pixel value of the photoluminescence light generated from the specimen when the p-polarized light is obliquely incident at the location where the s-polarized light is obliquely incident, to classify the dislocation defect in a depth direction of the specimen, based on whether or not a difference between the pixel values exceeds a predetermined threshold.

8. The semiconductor defect inspection apparatus according to claim 2, wherein the first and second polarization converters includes a polarizing plate which converts the excitation light into a linearly polarized light having a single vibration plane.

9. The semiconductor defect inspection apparatus according to claim 1, wherein the excitation light irradiator is configured to irradiate with the excitation light at the incident angle at which a penetration depth of the s-polarized light in the specimen is equal to or less than a predetermined depth.

10. The semiconductor defect inspection apparatus according to claim 1, wherein the semiconductor substrate is a silicon substrate.

11. The semiconductor defect inspection apparatus according to claim 1, wherein the excitation light irradiator emits the excitation light having an energy larger than a forbidden bandwidth of silicon.

12. The semiconductor defect inspection apparatus according to claim 1, further comprising: a first wavelength filter, a lens and a second wavelength filter which are disposed in the optical path.

13. A method using a semiconductor defect inspection apparatus for inspecting a specimen including a semiconductor substrate having a surface on which a predetermined pattern is formed, the inspection apparatus including an excitation light irradiator, a first polarization converter, a detector, and a defect analysis detector, the method comprising:
   irradiating, by the excitation light irradiator, the a specimen with excitation light along an optical path from the irradiator to the specimen and such that the excitation light is obliquely incident at a predetermined incident angle, wherein the first polarization converter is disposed in the optical path;
   converting, by the first polarization convertor, the excitation light into s-polarized light;
   detecting, by the detector, photoluminescence light generated from the specimen when the excitation light is incident on the specimen; and
   detecting, by the defect analysis detector, a dislocation defect by analyzing a photoluminescence image obtained by photoelectrically converting the photoluminescence light.

14. The method according to claim 13, further comprising:
   converting, by a second polarization converter of the semiconductor defect inspection apparatus, the excitation light into p-polarized light;
   determining, by a controller of the semiconductor defect inspection apparatus, a polarization direction of the excitation light;
   controlling, by the controller, the first polarization converter and the second polarization converter such that the excitation light is converted into linearly polarized light in the determined polarization direction; and
   comparing, by the defect analysis detector, the photoluminescence light generated from the specimen when the s-polarized light is obliquely incident, with the photoluminescence light generated from the specimen when the p-polarized light is obliquely incident at the location where the s-polarized light is obliquely incident, to classify the dislocation defect in a depth direction of the specimen.

15. The method according to claim 14, wherein irradiating the specimen comprises:
   irradiating, by the excitation light irradiator, with the excitation light at the incident angle at which a penetration depth of the s-polarized light in the specimen is equal to or less than a predetermined depth, and a penetration depth of the p-polarized light in the specimen is greater than the predetermined depth.

16. The method according to claim 15, wherein the incident angle is equal to or more than an angle at which a reflectivity becomes zero when the p-polarized light is obliquely incident on the specimen.

17. The method according to claim 13, wherein irradiating the specimen comprises:
   irradiating, by the excitation light irradiator, with the excitation light at the incident angle at which a penetration depth of the s-polarized light in the specimen is equal to or less than a predetermined depth.

18. The method according to claim 13, wherein the semiconductor substrate is a silicon substrate.

* * * * *